(12) United States Patent
Duchenij

(10) Patent No.: US 9,823,891 B2
(45) Date of Patent: Nov. 21, 2017

(54) ELECTRONIC NAME PLATE

(71) Applicant: AV Application, Braine-l'Alleud (BE)

(72) Inventor: Thierry Duchenij, Braine-le-Chateau (BE)

(73) Assignee: AV APPLICATION, Braine-l'Alleud (BE)

( * ) Notice: Subject to any disclaimer, the term of this patent is extended or adjusted under 35 U.S.C. 154(b) by 0 days.

(21) Appl. No.: 14/749,831

(22) Filed: Jun. 25, 2015

(65) Prior Publication Data

US 2016/0379537 A1    Dec. 29, 2016

(51) Int. Cl.
*G09G 3/14*    (2006.01)
*G06F 3/16*    (2006.01)
*G09G 3/16*    (2006.01)

(52) U.S. Cl.
CPC    *G06F 3/16* (2013.01); *G09G 3/16* (2013.01)

(58) Field of Classification Search
CPC .. G09G 3/14; G02B 2027/0134; G02B 21/22; G02B 27/22; G02B 27/2207; G02B 27/2214; G02B 27/2221; G02B 27/2228; G02B 27/2235; G02B 27/2242; G02B 27/225; G02B 27/2257; G02B 27/2264; G02B 27/2271; G02B 27/2278; G02B 27/2285

See application file for complete search history.

(56) References Cited

U.S. PATENT DOCUMENTS

| | | | | |
|---|---|---|---|---|
| 2008/0258997 A1* | 10/2008 | Arai | ......................... | G09G 3/003 345/6 |
| 2009/0154765 A1* | 6/2009 | Watanabe | ................ | G06F 21/84 382/100 |
| 2009/0313245 A1* | 12/2009 | Weyl | .................. | G06F 17/30253 |
| 2010/0323431 A1* | 12/2010 | Rutkowski | .............. | G09G 3/006 435/286.1 |
| 2014/0333859 A1* | 11/2014 | Zhang | ..................... | G02B 27/22 349/15 |

* cited by examiner

*Primary Examiner* — Insa Sadio
(74) *Attorney, Agent, or Firm* — Patrick J. Daugherty; Driggs, Hogg, Daugherty & Del Zoppo Co., LPA

(57) ABSTRACT

Described herein is an electronic name plate device (10) for use with an audio visual system. The electronic name plate (10) comprises an electronic paper display (100) which includes an array of character blocks (101), a processor (120), a receiver (170) for receiving information relating to at least one character to be displayed by the electronic name plate (10), and a power supply. The electronic paper display is mounted on a panel (102) which can be mounted within a docking station. A control system, such as, an audio visual system, is provided for controlling each electronic name plate in-situ in a conference room in front of a participant seat.

18 Claims, 8 Drawing Sheets

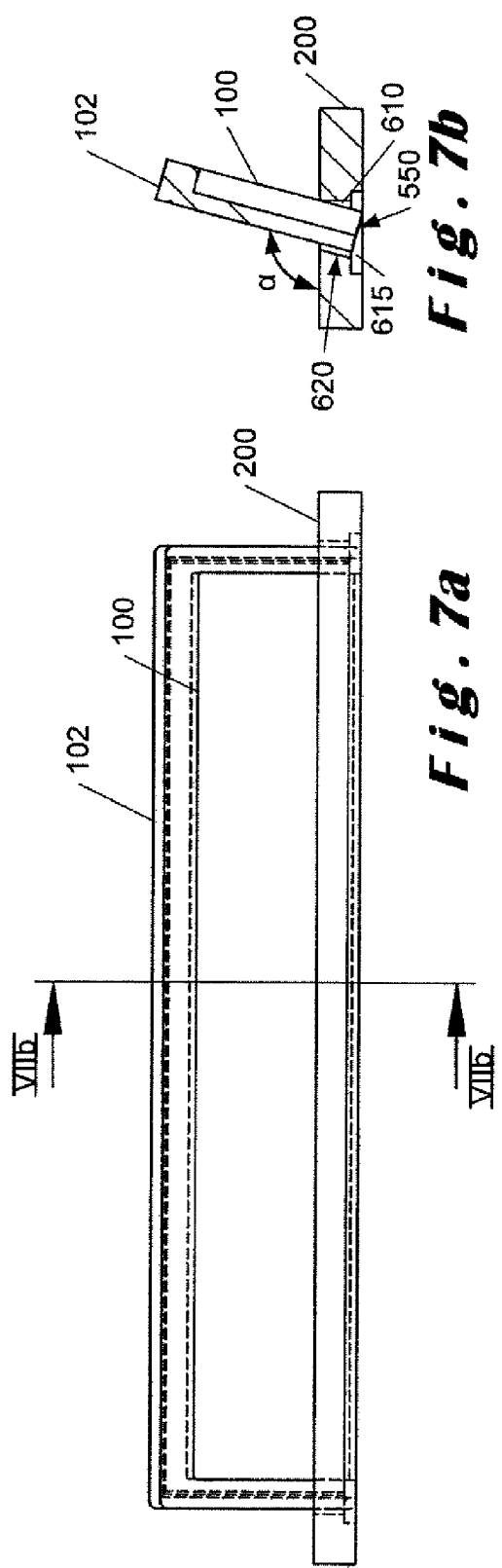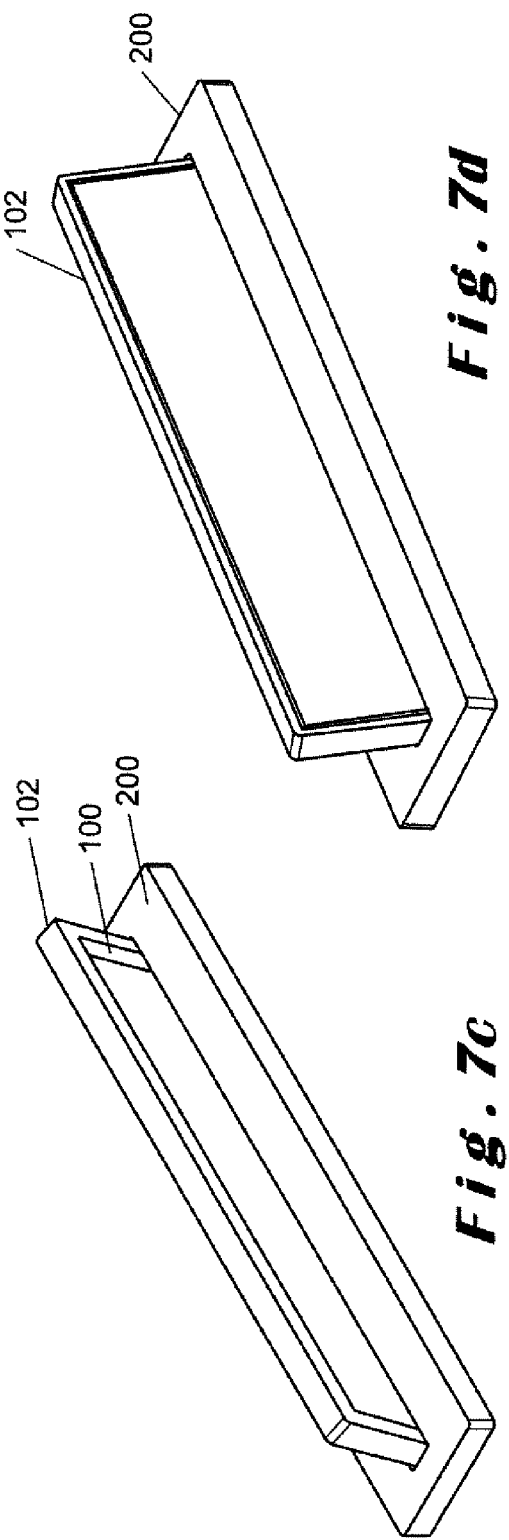

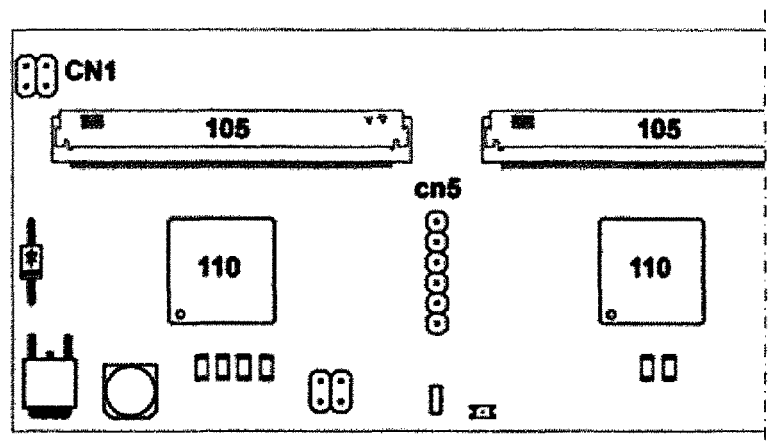
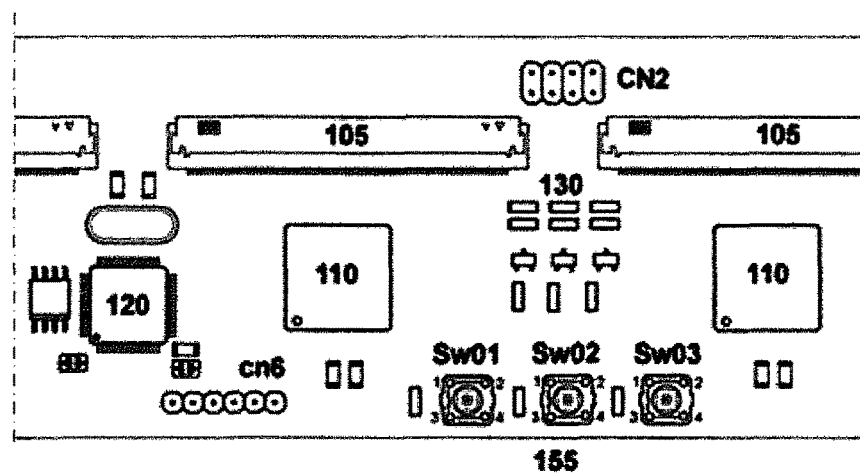
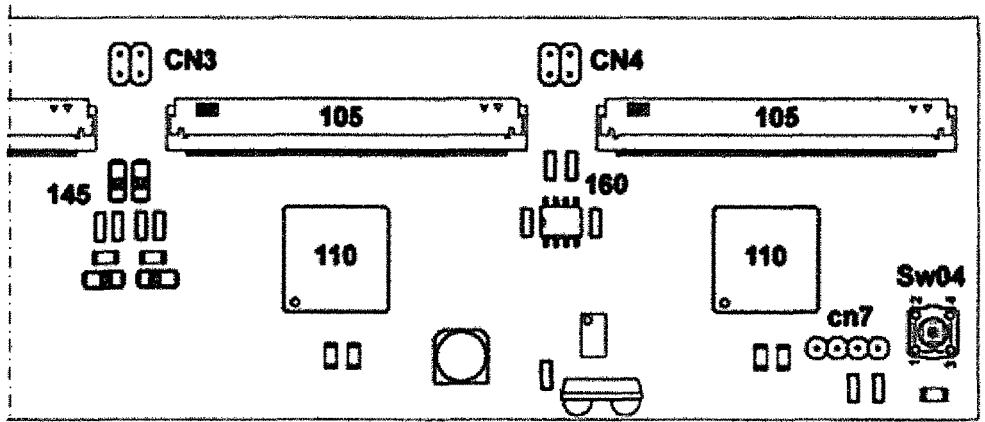
Fig. 9

ELECTRONIC NAME PLATE

FIELD OF THE INVENTION

The invention relates to an electronic name plate for use with an audio visual system.

BACKGROUND OF THE INVENTION

It is known to use paper name plates for participants to a session, such as a conference or other meeting, so that each participant can readily be identified by other participants sitting in the session. During the preparation of a conference room, an Assembly Hall, a Chamber or other meeting room for such a session, it generally necessary, prior to the session, to create name plates for each participant of the session. This preparation typically requires printing the name of each participant on a paper name plate, and which, according to the size of each session, a considerable amount of paper which is then discarded wasted after the session has finished. After printing of the name plates, they need to be at least positioned in front of the place allocated to the participant with whom the name plate is associated. In some instances, the paper name plates need to be inserted in name plate holders, which may already be provided in front of each participant seat or which need to be positioned accordingly according to a predetermined plan or scheme. For example, for plenary sittings, 751 Members of the European Parliament meet in the Chambers, which requires the preparation of 751 name plates. NATO sittings also imply a large number of participants. For such large sessions, a person currently needs to place each name plate in front of the relevant seat, according to a plan. This has the disadvantage that the preparation time for each session tends to be drawn out, particularly if the session is to be attended by large numbers of participants.

Moreover, when a last minute change is required, changing, adding or cancelling one or more paper name plates may also add to the preparation time as new name plates need to be printed, and each seat for which a change needs to be made must be located and the substitute made.

SUMMARY OF THE INVENTION

It is therefore an object of the present invention to provide an electronic name plate which reduces the waste of raw materials, such as, paper and ink.

It is another object of the present invention to provide an electronic name plate which can readily be programmed and updated as required.

In accordance with one aspect of the present invention, there is provided an electronic name plate for use with an audio visual system, the electronic name plate comprising: an electronic paper display including an array of character blocks, a processor connected to the electronic paper display for controlling the characters displayed in the array of character blocks, at least a receiver connected to the processor and operable for receiving character information and for transmitting the character information to the processor, and a power supply connected to at least the processor and operable for providing power at least when a change in the electronic paper display is required.

The use of electronic name plates according to the invention advantageously provides paperless system which and can readily be fixed in position, if necessary, in front of a participant seat in a meeting room. As the name plates are electronic, there is no need to use any paper or ink and these resources are therefore eliminated.

The use of electronic name plates also greatly reduces the set-up time including seating arrangements prior to a meeting. Each electronic name plate, placed in front of each participant seat, can be automatically set according to the predefined seating arrangement and also updated in accordance with any changes in the predefined seating arrangement. Electronic paper display technology requires a power supply only during the transfer of data to update the characters to be displayed. A passive system is therefore provided which is universal and may be used with any audio visual system.

In a preferred embodiment, the electronic name plate further comprises a driver connected between the electronic paper display and the processor.

In an embodiment of the disclosure, the processor further comprises a memory, the memory being operable for storing data to be displayed on the electronic paper display.

The memory may store up to 1000 names and sequence of characters and may therefore be configured manually without an external computer. The names can be changed with buttons located on the rear panel.

In an embodiment of the disclosure, the receiver is configured to operate with at least one of: radio, sonic, ultrasonic, and optical frequencies.

Such a solution provides the advantage that the electronic name plates may be wireless.

In a preferred embodiment of the present invention, the receiver is configured to operate with infrared frequencies.

The use of infrared frequencies for transmission of data provides a secure and inviolable digital transmission link which may be implemented outside of a meeting or conference room where the electronic name plates are located.

In an embodiment, the electronic name plate further comprises at least a docking station configured to support the electronic paper display.

The docking station provides a support for the electronic paper display. An optimal arrangement of the docking station provides visibility of the name displayed from other participants to the meeting.

In a preferred embodiment, the electronic paper display is fixed to a panel, the panel being mountable within the docking station.

Advantageously, the panel provides protection for the electronic paper display. When the panel is mounted within the docking station, the name is visible to other participants.

In an embodiment, the electronic paper display device further comprises an array of lights which can be controlled by at least one button connected to the processor.

The switching on and off of lights may show the result of a voting, show a speaker. The colour of the lights may also illustrate the colour of a political party, etc.

In a further embodiment, the array of lights comprises a plurality of light-emitting diodes.

Light-emitting diodes have a long life, are energy-efficient, ecological, provide design flexibility, they turn on immediately when powered up, and require low voltage power supply.

The array of lights may comprise at least one backlight.

By providing at least one backlight, it is possible to illuminate the electronic name plate without interfering with the display on the electronic paper display.

In a further embodiment, the docking station comprises at least one of: the processor, the receiver, the power supply, the driver and the memory.

The panel is therefore very light and can be placed in any docking station already placed in front of every participant seat. Naturally, the panels with their electronic paper displays may be removed from their docking stations when not in use.

In a further embodiment, at least one character block comprises between 7 and 40 segments.

The segments activated by the electronic paper display technology provide the representation any desired character. The use of more segments per character block provides the ability to represent characters of a number of different alphabets.

In a preferred embodiment, the at least one character block comprises 26 segments.

Advantageously, by having 26 segments, more characters can be represented than is possible with conventional seven- or eight-segment character blocks. Cyrillic characters and other non-Latin characters may be displayed due to the extra segments.

The audio visual system allows the control of a plurality of electronic name plates according to the invention and placed within a conference room.

In accordance with another aspect of the present invention, there is provided an audio visual system comprising:
  a plurality of electronic name plates as described above,
  a transmitter for transmitting data to at least one receiver, the data comprising the information to be displayed on each electronic name plate, and
  a controller for controlling the transmitter and each individual electronic name plate.

The audio visual system enables the control of a plurality of electronic name plates according to the invention. The electronic name plates may be installed within a conference room and may be controlled from a controller, which may or may not be located the meeting room. Each electronic name plate is addressable, and may easily be removed when not needed. Similarly, names of participants in a list may be sent to different electronic paper displays based on their IP addresses. The electronic paper display is universal and may be associated with all commercially available audio visual systems. The electronic paper display device may be adaptable to the needs of each manufacturer and may be amended accordingly (number of characters, number of segments, logo, etc.).

In accordance with a further aspect of the present invention, there is provided electronic paper comprising a plurality of character blocks, each character block comprising at least 26 segments.

As described above, more characters can be represented with at least 26 segments than is possible with conventional seven- or eight-segment character blocks. Cyrillic characters and other non-Latin characters may be displayed due to the extra segments.

BRIEF DESCRIPTION OF THE DRAWINGS

For a better understanding of the present invention, reference will now be made, by way of example, to the accompanying drawings in which:

FIG. 7a illustrates a front view of the electronic name plate according to the invention, FIG. 7b illustrates a sectioned view of the electronic name plate illustrated in FIG. 7a taken along the line VIIb-VIIb, FIG. 7c illustrates a perspective view of the back of electronic name plate device of FIG. 7a, FIG. 7d illustrates a perspective front view of the electronic name plate device of FIG. 7a, FIG. 8 illustrates a selection of characters which can be displayed using the character block of FIG. 3, and FIG. 9 illustrates a printed circuit board for use in the electronic paper display device of FIG. 1.

DESCRIPTION OF THE INVENTION

Figure 1:
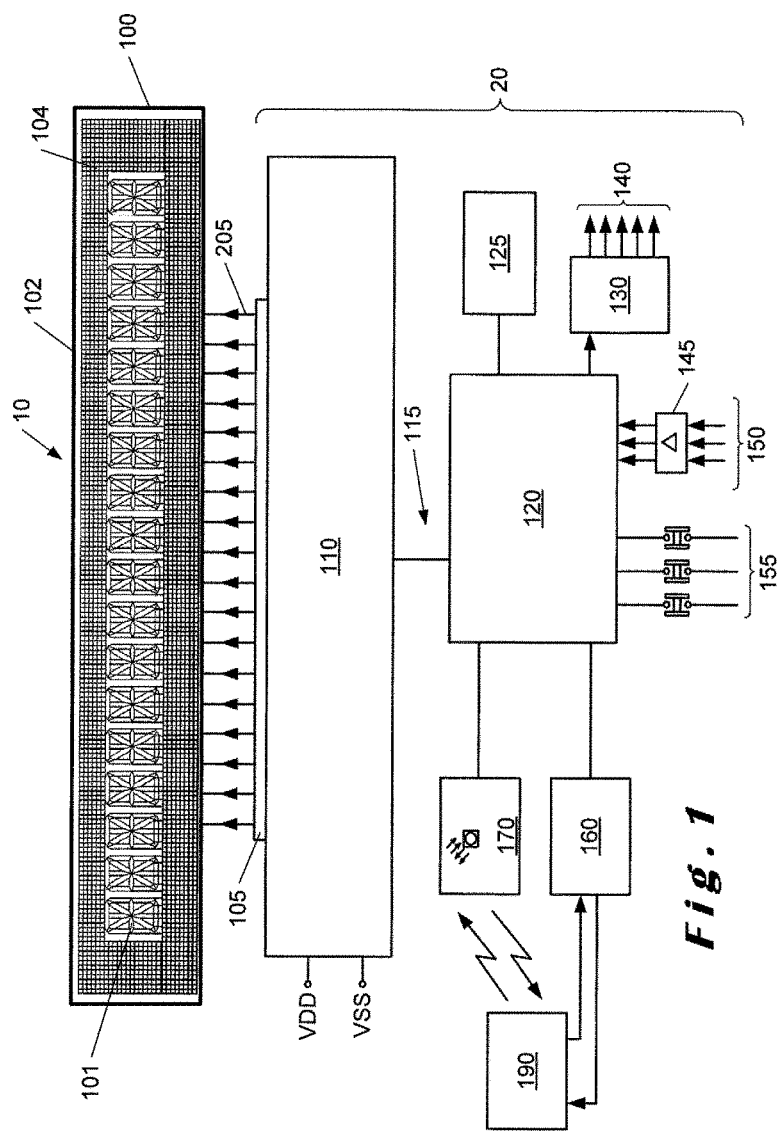
FIG. 1 illustrates a block diagram of the electronic paper display device according to the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

The object of the current invention is to provide an electronic name plate device as part of an audio visual (AV) system. The electronic name plate is placed in front of each participant's seat to display the participant's name. The name may be automatically changed.

The electronic name plate device according to the invention comprises an electronic paper display installed in a panel/docking station arrangement for use in meeting or conference rooms where a session is to be held and in which the name of each participant needs to be displayed in front of each participant seat The electronic name plate device also comprises electronic components which permit modifications to be made to character blocks of the electronic paper display as required. The electronic paper display and its electronic components will first be described, followed by the panel/docking station arrangement.

FIG. 1 illustrates an embodiment of an electronic name plate device 10 according to the present invention. The electronic name plate device 10 comprises an electronic paper display 100 and a plurality of electronic components 20.

Figure 3:
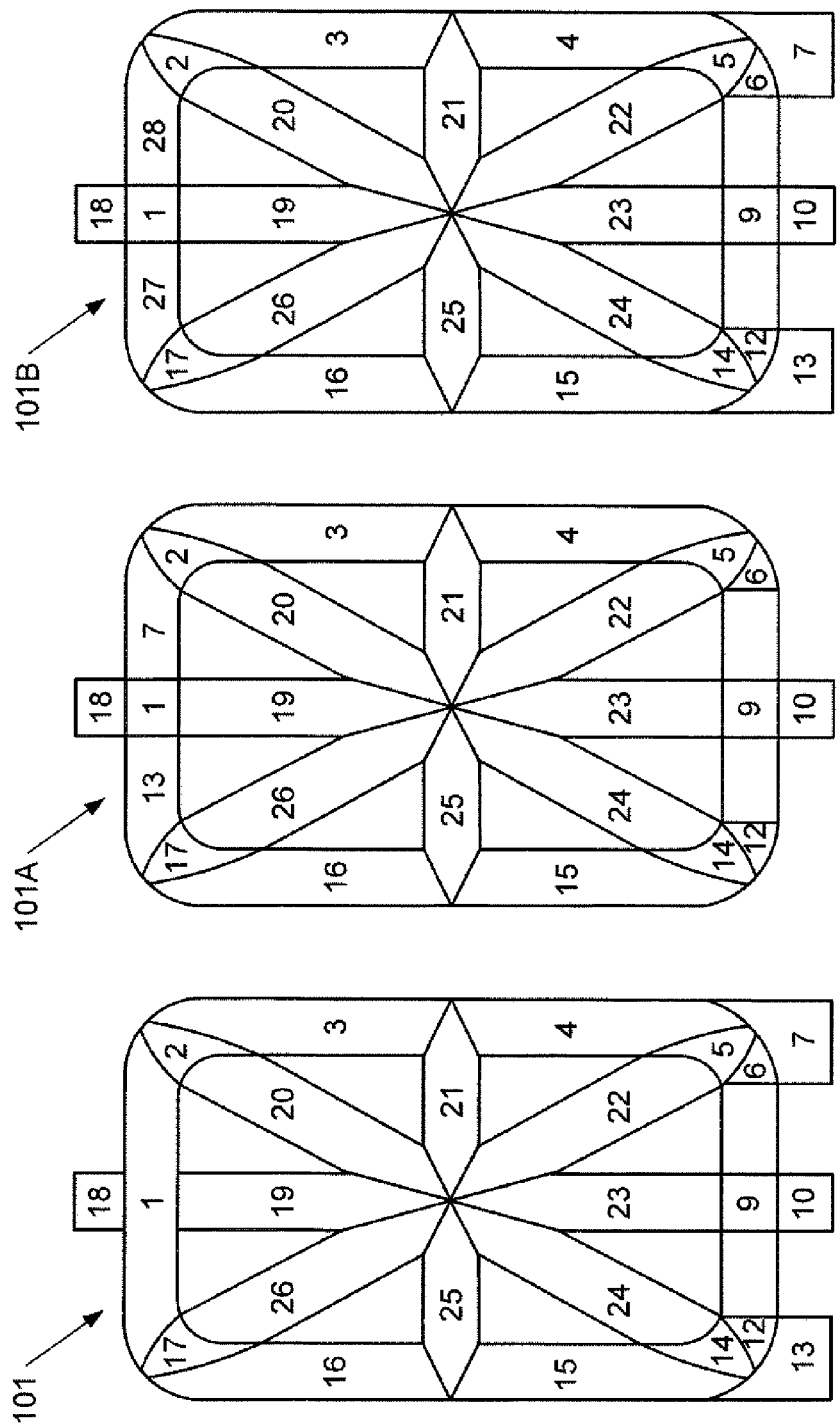
FIG. 3a illustrates a character block in accordance with one embodiment of the present invention.
FIG. 3b illustrates a character block in accordance with a second embodiment of the present invention.
FIG. 3c illustrates a character block in accordance with a third embodiment of the present invention.

The electronic paper display 100 comprises at least one character block 101, each character block being formed by a plurality of segments (1 to 26 as described below with reference to FIG. 3). In the embodiment illustrated in FIG. 1, the electronic paper display 100 comprises 18 characters blocks 101, each comprising 26 segments.

The electronic paper display 100 is mounted in or on a panel 102 which is mountable in a docking station 200 (FIGS. 6 and 7a to 7d) as will be described in more detail below.

Preferably, the electronic paper display 100 further comprises an array of programmable light elements 104 which surround the character blocks 101. The programmable light elements 104 provide the ability to display other information, for example, drawings such as logos. It will readily be appreciated that the array of programmable light elements 104 is not limited to surrounding the character blocks 101 but may be located above, below, to the left, to the right or at any other suitable position with respect to the character blocks 101. In one embodiment, the array of programmable light elements 104 comprises 954 elements. The electronic paper display 10 is described in more detail with reference to FIG. 2.

Figure 2:
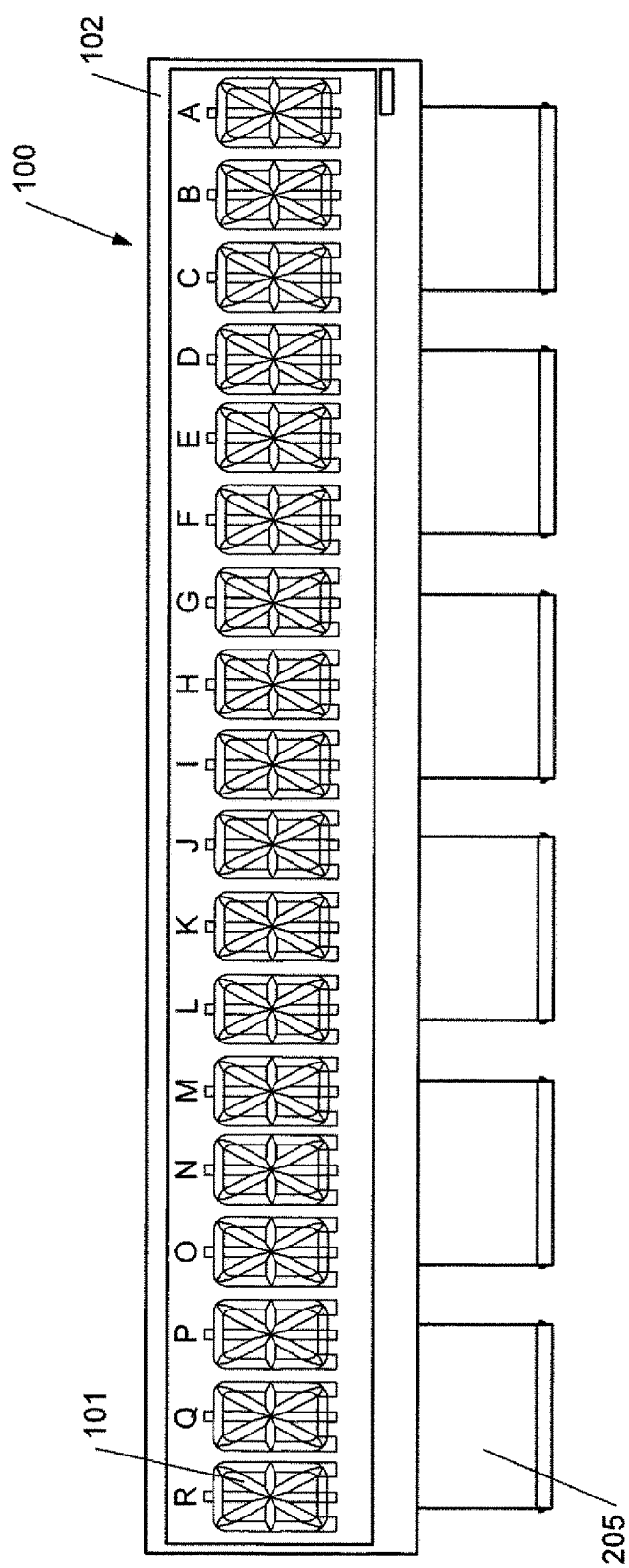
FIG. 2 illustrates the electronic paper display together with connectors and character blocks.

The electronic components 20 include an electronic paper display driver 110, connected to the electronic paper display 100 by a plurality of cables 205 (shown generally as arrows in this figure) and a plurality of cable connectors 105 (shown generally as a single connector in this figure). It will readily be appreciated that the cables 205 and the cable connectors 105 are shown schematically in FIG. 1. In the illustrated embodiment, one cable is used for three character blocks 101 as shown in FIG. 2.

A processor 120 is connected to the electronic paper display driver 110 by a bus 115. In a preferred embodiment, the processor 120 is a microprocessor and the bus 115 is a multi-master, multi-slave, single-ended serial computer bus such as an "I2C" control bus, an "inter-integrated circuit" bus, manufactured by NXP Semiconductors, which is also known as "I$^2$C" and "IIC" control buses.

The display driver 110 and the cables 205 may be separated as one display driver 110 may be associated with one of the cables 205 as will be described in more detail below with reference to FIG. 9.

In a preferred embodiment, the processor 120 further comprises two power supply pins, a positive and a negative power supply shown as VDD and VSS respectively on FIG. 1.

The processor 120 is connected to a transceiver 170, configured to at least receive data from an audio visual system 190 as shown. The data comprises the information to be displayed on the electronic paper display 100. Preferably, the transceiver is configured to operate with at least one of radio, sonic, ultrasonic, or optical frequencies. In a preferred embodiment, it is configured to operate with optical frequencies, and more preferably with infrared frequencies. The use of infra-red for transmission of data provides a secure and inviolable digital transmission link which may be located outside of the meeting or conference room where the electronic name plates are located. Preferably, each processor has a unique identifier, which may be a unique address, for example, an IP address.

In an embodiment, the transceiver 170 may be replaced by a receiver if no two-way communication is required.

Preferably, the processor 120 is connected to the AV system 190 by a bus 160. In a preferred embodiment, the bus is bi-directional. In an embodiment, the bus is a "TIA-485-A" bus (also known as a "ANSI/TIA/EIA-485" bus, a "TIA/EIA-485" bus, "EIA-485" bus or "RS-485" bus). The "TIA-485-A" bus enables the electronic name plate device to be able to communicate with the AV system 190, via the bus 160 over long distances (~1 km).

The transmission of information to the AV system 190 is initiated as required either wirelessly via the integrated infrared transceiver 170 or via the "TIA-485-A" bus 160 and integrated external controls connected through the support.

In an embodiment of the present invention, the processor 120 is connected to at least one control button 155 for controlling at least one light, not shown in the figures. Preferably, each light is installed in the proximity of the periphery of the electronic paper display 100. Preferably, each light comprises a light-emitting diode (LED). In an embodiment of the present invention, eight coloured LED lights are installed around the electronic paper display to illuminate the contour of the display. The colour displayed by the LED lights may be associated with a colour representing a company present or a political party. The LED light(s) may also be used to indicate when a participant speaks, or represent the response of the participant to a vote. The displayed votes may be displayed as part of the AV system 190 which comprises an integrated voting system, each colour represents a voting choice, for example, green for "yes", red for "no", blue for "abstention", etc. Activation of a combination of the control buttons 155 may result in a particular colour being displayed.

In another embodiment, at least one LED backlight may also be provided in the electronic paper display device. Such an LED backlight may be provided on the panel 102 or may be provided in a base into which the panel is inserted for display as described in more detail below with reference to FIGS. 7a to 7d.

The processor 120 is connected to a power supply, not shown in FIG. 1. The power supply may be a battery, a fuel cell or an electrical outlet.

In an embodiment of the present invention, the processor 120 comprises an internal memory (not shown). In another embodiment of the present invention, the processor 120 is connected to an external memory 125. Both the internal memory and the external memory 125 may be used for storing a plurality of names to be displayed on the electronic paper display 100. Preferably, the memory may store 1000 names or words of up to 18 characters and permits the integration of most alphabets (Arabic Din 31635, Aramaic, Armenian, Cyrillic, Coptic, Esperanto, Gothic, Greek, Latin, etc.). The names displayed by the electronic name plate can be chosen from the list of names stored in the internal memory by means of a button.

The processor 120 is preferably connected to an output driver 130 for transmitting output data 140.

The processor is preferably connected to a data receiver 145 and receives input data 150.

In a preferred embodiment, the AV system 190 comprises a controller (not shown) for controlling at least the electronic name plate forming part of the AV system. Naturally, such a controller is also operable for controlling other elements of the AV system, for example, projectors and screens etc. Software is preferably executed on the controller to provide control of each electronic name plate. Each electronic name plate is preferably identifiable by a unique address, for example, a unique internet protocol (IP) address. The AV system 190 further comprises at least a transmitter (not shown) for transmitting the data to be displayed by each electronic name plate. Preferably, the controller is installed on a computer, which is operable for setting up the character information to be displayed on each name plate.

The infrared transceiver 170 and the bus 160 are bi-directional and are primarily used for the transfer of information to the electronic paper display device 100 from the AV system 190. This information may include: set-up data (including checking the operation of the electronic paper display device and its sub-systems as well as checking the operation of the display itself), and, a library containing the names the speakers.

In one embodiment, the remote library may be locally edited and confirmation of the revisions may be transmitted back to a management computer or other device from which the library originated.

Both the infrared transceiver 170 and the bus 160 may be used for the transmission of data to and reception of data from external programs, for example, for microphone management and control, for providing voting rights by activating integrated LED lights as described above, displaying the name of the speaker, etc.

In addition, both the infrared transceiver 170 and the bus 160 provide external controls for the processor 120 to enable data entry input 145, 150 to the processor 120 and data output 130, 140 as shown in FIG. 1. The infrared connection or bus with the transceiver 170 may be considered to provide "software" control and the physical bus 160 may be considered to provide hardware control.

The provision of additional data to the processor 120 enables it to be able to adapt to different configurations, for example, light level detection for controlling the LED backlight as described above so that when the ambient light falls below a predetermined threshold, the LED backlight is activated, to enable/disable functionality of the electronic paper display device so that the additional functionality is not operated at an inappropriate time, either inadvertently or deliberately.

The output data 140 from the data output 130 may comprise information, a command or a confirmation which is sent to an external system. Such information may either be digital or analogue information.

In a preferred embodiment, the electronic components 20 as shown in FIG. 1 are mounted a circuit board as will be described with reference to FIG. 9 below. The circuit board is mounted within the panel 102 with the cables 205 connecting the electronic paper display 100 to the circuit board and the electronic components described above.

FIG. 2 illustrates the electronic paper display 100 fixed to the panel 102. The electronic paper display 100 may comprise an array of 18 character blocks 101. Each character block 101 comprises a plurality of segments. As shown in FIG. 2, each character block 101 is labelled "A" to "R" from right to left.

Although 18 character blocks are shown in FIG. 2, it will readily be appreciated that the electronic name plate device may comprise either more or less than 18 character blocks. In addition, depending on the size of the electronic name plate display 100, more than one row and/or column of character blocks may be provided.

The electronic paper display 100 is based on electronic paper technology which allows a reading similar to that of a book. The electronic paper display 100 is passive when the data is displayed and requires no internal lighting because it takes advantage of ambient light as a traditional book.

In a preferred embodiment, the panel 102 comprises brushed polymethylmethacrylate (PMMA) material or acrylic glass (also known as "Perspex" (registered trademark of ICI plc), "Plexiglas" (registered trademark of Evonik Industries) and other trade and generic names). In the example illustrated in FIG. 2, the dimensions of the panel 102 are the following: 350 mm by 60 mm by 20 mm. Preferably, the panel 102 is placed over the electronic paper display 100.

As illustrated in FIG. 2, the electronic paper display 100 comprises a plurality of flat cables 205 configured for connecting the electronic paper display 100 to the circuit board, for example, using the cables 205. Preferably, the cables 205 are configured to connect the electronic name plate display 100 to the circuit board (as described below with reference to FIG. 9). The panel 102 is mountable in a docking station as will be described below with reference to FIGS. 5, 6 and 7a to 7d.

It will be appreciated that in other embodiments, the docking station may include the electronic components 20 described above. In this case, the provision of the flat cables, with suitable cable connectors, allows the panel 102 to plug easily into complementary connectors provided in the docking station.

The number of flat cables 205 and the number of contacts per cable 205 depends on the number of character blocks 101 in the electronic paper display 100 and the number of segments per character block. In the embodiment described below with reference to FIGS. 3a and 3b, the total number of segments on the display is 468, that is, 18 character blocks each comprising 26 segments. There are 6 flat cables, each comprising 80 contacts, providing a total number of contacts of 480, which is enough for connecting the 468 segments. Naturally, fewer flat cables may be required if there are less than 18 character blocks or if there are less segments in each character block. Similarly, if there are more character blocks and/or more segments in each character block, more flat cables may be required.

In the embodiment described below with reference to FIG. 3c, there are 18 character blocks each comprising 28 segments, a total of 504 segments and therefore contacts. If cables comprising 80 contacts are used, another flat cable will be required. However, it may be more efficient to use 9 flat cables each having 60 contacts (a total of 540 contacts) so that 2 character blocks may be controlled used each cable. Naturally, other suitable arrangements of cables may be utilised in accordance with the number of contacts each cable can provide.

The electronic paper technology allows a display of characters through a single polarization which occurs during data transfer. Once the characters or patterns are sent and displayed, the electronic paper keeps the displayed characters in memory without requiring additional external power.

FIG. 3a illustrates one embodiment of a character block 101 of the electronic paper display 100. The character block 101 comprises 26 segments. The 26 segments allow the display of any type of characters included in the traditional and Cyrillic alphabet. The 26 segments are numbered from 1 to 26 on the figure. Each character is determined by a configuration of segments. For instance, the letter "O" may be represented with segments 1, 2, 3, 4, 5, 6, 8, 9, 11, 12, 14, 15, 16, and 17 (as shown in character block "K" of FIG. 4), and the number "0" may be represented by segments 1, 2, 3, 4, 5, 6, 8, 9, 11, 12, 14, 15, 16, and 17 similar to the representation of the letter "O" but with the addition of segments 20 and 24 to provide the distinction (as shown in character blocks "F" and "G" of FIG. 4). Similarly, the distinction the letter "B" may be represented by segments 1, 2, 3, 4, 5, 6, 8, 9, 11, 12, 14, 17, 24 and 26 as shown in character block "L" of FIG. 4 and the number "8" may be represented by segments 1, 2, 3, 4, 5, 6, 8, 9, 11, 12, 14, 15, 16, 17, 21 and 25 (not shown).

FIG. 3b illustrates another embodiment of a character block 101A in accordance with the present invention. The character block 101A also comprises 26 segments but arranged in a different configuration. Segments 2 to 6, 8 to 12 and 14 to 26 are identical to respective segments of the character block 101 shown in FIG. 3a. In the embodiment of FIG. 3b, segments 13 and 7 are removed from their locations at the bottom of the character block and form, with segment 1 a new upper bar which is divided into three segments namely, segments 13, 1 and 7 as shown.

FIG. 3c illustrates another embodiment of a character block 100B in accordance with the present invention. The character block 101B comprises 28 segments. Segments 2 to 26 are identical to respective segments of the character block 100 shown in FIG. 3a. In the embodiment shown in FIG. 3c, segment 1 is smaller and can be considered to be effectively divided into three segments, namely, new segment 27, segment 1 and new segment 28 as shown.

A character representation with less segments is also possible, for example, the conventional seven- or eight-segment character blocks may be used, but it will be appreciated that the ability to display characters in any alphabet as described above will be restricted by the number of segments. Other representations with up to forty segment character blocks are also possible.

When comparing the character block 101 in accordance with the present invention having 26 segments with the conventional seven- or eight-segment character blocks, segment 1 is used as such; each pair of segments 2 & 3, 4 & 5, 14 & 15 and 16 & 17 are combined to form single segments; segments 6, 8, 9, 11 and 12 are combined to form a single segment which is the equivalent of segment 1; and segments 21 and 25 may be combined (for the seven-segment character block) or separated (for the eight-segment character block). All other segments are not used.

As described above, in accordance with the present invention, each character block 101 comprises 26 segments, and each segment corresponds to a switchable element. Each switchable element can be switched from white to black (for display) or from black to white (when erasing or changing what is displayed).

Each segment or switchable element has its own dedicated drive line over which signals are provided to switch from white to black or from black to white. Two electrodes are provided in each segment which need to be in opposite states. When charged, pigment within the segment moves up or down. If the charge does not change, the pigment stays in place within the segment.

Each segment in the display may be driven with a square wave operating at a suitable voltage, for example, between 0 and 5V or between 0 and 15V.

Global updates can be performed on the character block where all segments are switched to one state, that is, to being either all white (changing from black to white) or all black (changing from white to black), during the update, with segments in the desired state flashing as part of the change. Background fields may be changed in global updates.

Local updates are also possible for changing individual segments in the character block to change what is displayed. Background field tend not to be changed during local updates.

A finite state machine (FSM) may be used for controlling the segments and their changes from white to black or from black to white. Such an FSM may have four states: "start_update", "wait", "update complete" and "idle" for performing the updates for each segment.

As described above, power is only applied to the segments in the character blocks forming the display when a change of state is required and the segments hold their state until they are updated or erased. In this way, each electronic paper display for a conference may either be programmed in-situ or may be programmed remotely and then moved to the conference room or other facility where the electronic paper display device is to be used.

Figure 4:
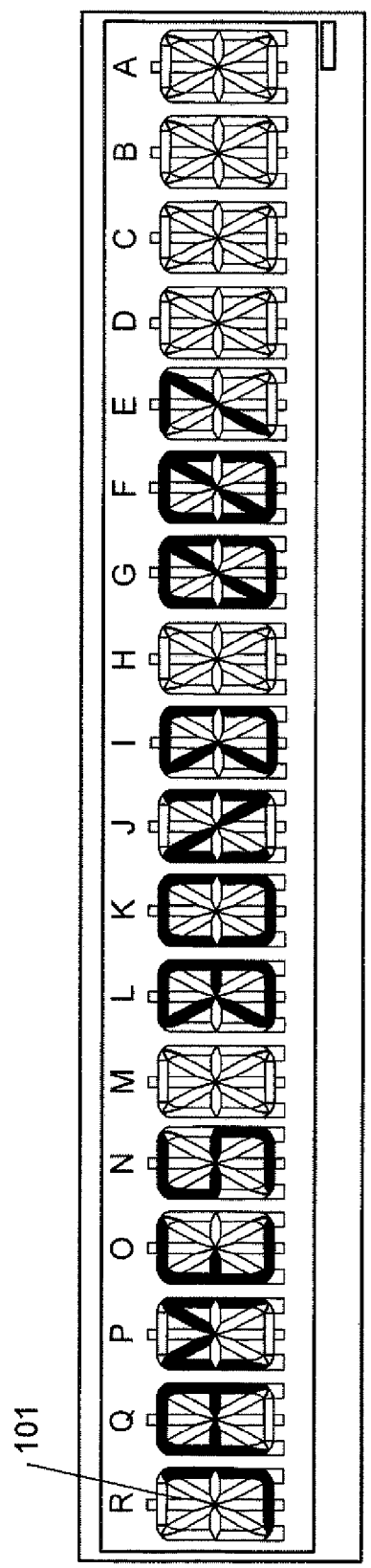
FIG. 4 illustrates an example of a name displayed in the electronic paper display.

FIG. 4 illustrates an example of a name displayed on the electronic paper display 100 using the 26-character representation as shown in FIG. 3a. The example of "JAMES BOND 007" is displayed where character blocks "E" to "G", "I" to "L" and "N" to "R" are used with character blocks "H" and "M" acting as spaces to align with a left hand edge of the electronic paper. It will be appreciated that character blocks "A" to "C", "E" to "H" and "J" to "N" could have been used with character blocks "D" and "I" acting as spaces to align the name with a right hand edge of the electronic paper, or character blocks "C" to "E", "G" to "J" and "L" to "P" with character blocks "F" and "K" acting as spaces if the name is to be centralised within the electronic display. The segments used for each character in the example "JAMES BOND 007" can readily be determined from the character block 101 shown in FIG. 3a.

It will readily be appreciated that other representations of each character are also possible. For example, using character block 101A of FIG. 3b and character block 101B of FIG. 3c, it is possible to provide a different representation of the character B in "JAMES BOND 007". Segments 4 to 6, 8 to 12, 14 to 17, 21, as well as segment 13 (FIG. 3b) or segment 27 (FIG. 3c) and segment 1 may be used for this different representation of the character B.

Figure 5:
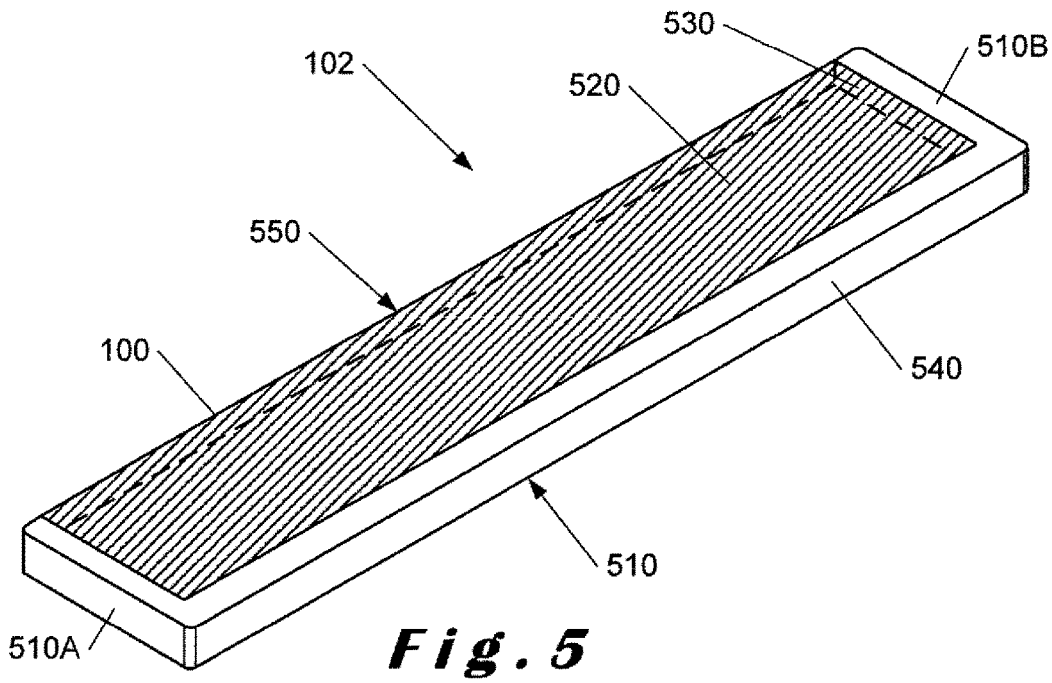
FIG. 5 illustrates the electronic paper display inserted inside a panel.

FIG. 5 illustrates the panel 102 and the electronic paper display 100 installed within the panel 102. The panel 102 preferably comprises a U-shaped frame 510 with a front support 520. The U-shaped frame 510 comprises two substantially parallel side portions 510A, 510B and a connecting portion 540 located therebetween. The dimensions of the U-shaped frame 510 correspond to the dimensions of the electronic paper display 100, and in particular the length of connecting portion 540 and the length of the parallel side portions 510A, 510B, such that the electronic paper display 100 may fit between the parallel side portions 510A, 510B of the U-shaped frame 510. The front support 520 is preferably rectangular and its contour matches the contour of the U-shaped frame 520. The thickness of the side portions 510A, 510B and the connection portion 540, as indicated at 530, of the U-shaped frame 310 is substantially the same as the thickness of the electronic paper display. The connection portion 540, when assembled in the docking station 200, represents a top edge of the panel 102, and edge 550 forms a bottom edge of the panel (as shown more clearly in FIG. 7b)

In a preferred embodiment, the U-shaped frame 520 is sized to accommodate the circuit board on which the electronic components 20 are mounted in addition to the electronic paper display. This provides a single unit which is self-powered (due to the presence of a battery on the circuit board) and which effectively is a stand-alone component which can readily be placed in any suitable location.

Figure 6:
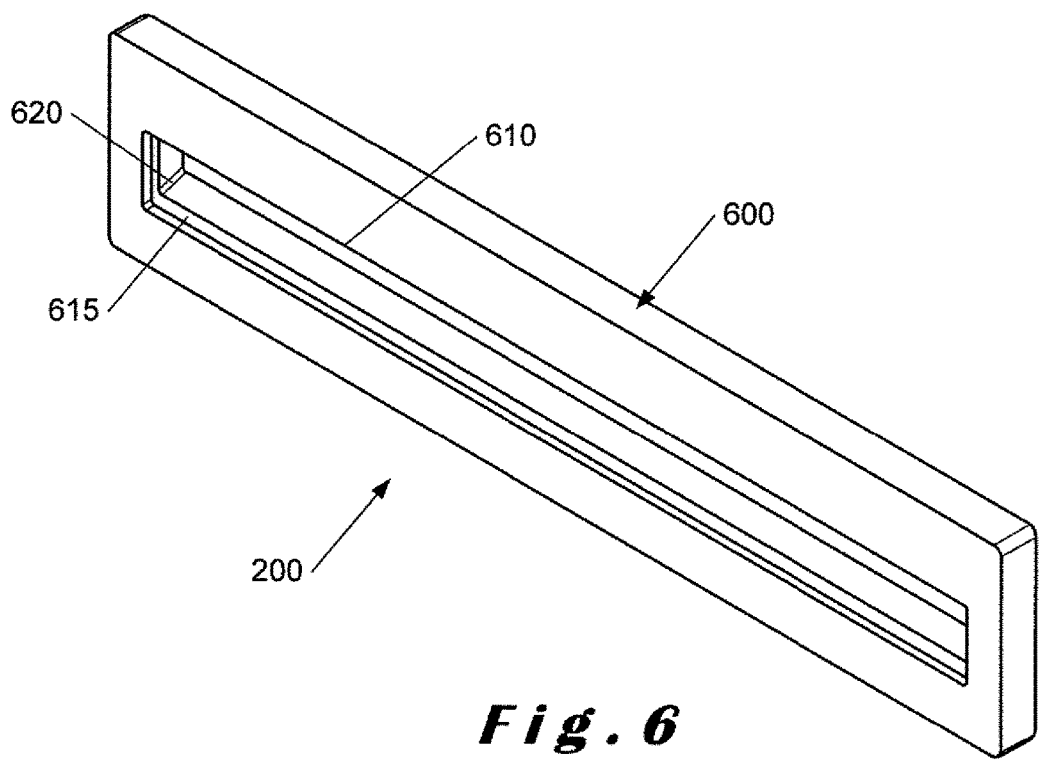
FIG. 6 illustrates a docking station according to the invention.

FIG. 6 illustrates a docking station 200 which is configured to support the panel 102. The docking station 200 comprises a rectangular frame 600 having a length and a width which are greater than the connection portion 540 of the panel 102. The frame 600 further comprises a rectangular recess 610 whose dimensions correspond to the dimensions of the connection portion 540 of the panel 102. In a preferred embodiment, the recess 610 comprises a chamfered surface 620 extending along its length. In a preferred embodiment, a lower portion of the recess 610 comprises a second recess 615 which is larger than the recess 610. The docking station 200 and its recesses 610, 615 are shown more clearly in FIG. 7b.

FIGS. 7a, 7b, 7c and 7d illustrate different views of the panel 102 docked inside the docking station 200.

FIG. 7a is a front view of the electronic paper display 100 inserted inside the panel 102 which is mounted in the docking station 200 as shown. As described above, the rectangular frame of the docking station 200 has a base which is longer than the length of the panel 102.

FIG. 7b is a sectioned view along the line VIIb-VIIb of FIG. 7a and illustrates the arrangement of the panel 102 within the docking station 200. The recess 610, comprising the chamfered surface 620, is configured such that the panel 102 with the electronic paper display 100 are at an angle α with respect to the base of the docking station 200. The angle α between the panel and the base of the docking station 200, in a clockwise direction from the base of the docking station, is preferably in the range of between 95 and 135 degrees, more preferably in the range of between 100 and 120 degrees, and, most preferably, at 105 degrees to the frame 600 forming the base of the docking station. The second recess 615 is also shown extending from the recess 610. As shown, the lower edge 550 of the panel 102 is supported by a surface (not shown) on which the docking station 200 is positioned.

FIGS. 7c and 7d are respective perspective back and front views of the panel 102, the electronic paper display 100 and the docking station 200.

Figure 8:
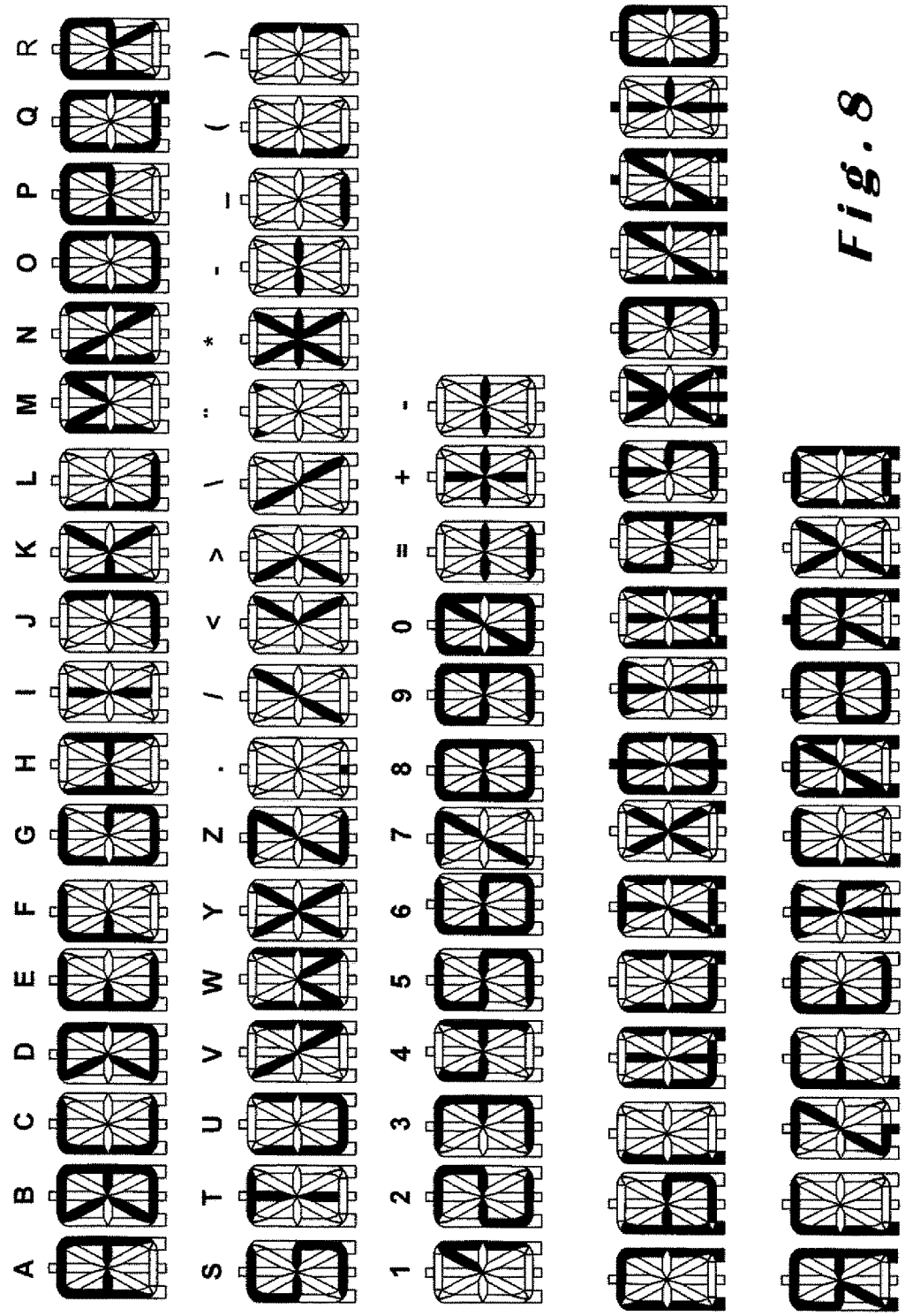

FIG. 8 illustrates character blocks representing the letters of the Latin alphabet (letters "A" to "Z"), numbers "0" to "9", and symbols "/", "<", ">", "*", "−", "_", "(", ")", "=", "+", "'". Representations of letters of the Cyrillic alphabet are also shown, for example, "Ф", "Э", "И", "й", "Я", "Г", "Є" and "Ћ". It will readily be understood that letters of the Greek and Coptic alphabets may also be represented.

FIG. 9 illustrates a circuit board which may be implemented in the electronic paper display device as described above with reference to FIG. 1. The circuit board preferably comprises a printed circuit board (PCB) on which the electronic components are mounted. As shown, there are six cable connectors 105 and six display drivers 110, each cable connector 105 being associated with a display driver 110 and operable for connecting to a flat cable (not shown) connected to the electronic paper display for driving the 18 character blocks. Each character block comprises 26 segments as shown in the embodiments of FIGS. 3a and 3b. As described above, more than or fewer than 6 cable connectors 105 (with associated flat cables 205 and display drivers 110) may be implemented in accordance with the number of character blocks implemented and the number of segments in each character block.

Four switches, Sw01, Sw02, Sw03, Sw04 are provided for switching functionality. Switches Sw01, Sw02 and Sw03 correspond to the switches 155 described above with reference to FIG. 1, and provide the functionality of being able to follow a pre-assigned call menu and sub-menu configuration. For example, Sw01 may perform multiple functions depending on the time for which the switch is depressed:

- as a simple "on-off" switch which provides access to a "MENU" where a first activation of the switch for less than 5 seconds, activates the "MENU" is activated and the electronic paper display 100 is switched on with a second activation of the switch for less than 5 seconds, de-activates the "MENU" and the electronic paper display 100 is switched off.
- as a "MENU" set-up where a first activation for more than 5 seconds enables Sw02 and Sw03 for displaying sub-menus for selection, and a second activation of switch disables Sw02 and Sw03, de-activates the "MENU" and switches the electronic paper display off.

As described above, Sw02 and Sw03 may be used for scrolling through sub-menus as shown in the examples in Table 1 below:

TABLE 1

| Action | Function | Display |
|---|---|---|
| Action A01 | | |
| SW01 – 1x | Call MENU | MENU |
| SW02 – (Down) | First sub-menu | NAME |
| SW03 + (Up) | Return to previous MENU | MENU |
| Action A02 | List A selection | |
| SW01 – 1x | Call MENU | MENU |
| SW02 – (Down) | First sub-menu | NAME |
| SW01 – 1x | Call letter A | A |
| SW01 – 1x 3 sec | Confirm letter A | A selected |
| SW02 – (Down) | Call 1st name in list A | Mr. Alphonse |
| SW02 – (Down) | Call next name in list A | Mrs. Anabelle |
| SW02 – (Down) | Call next name in list A etc. | Mr. Attila |
| SW03 – (Up) | Call previous name in list A | Mrs. Anabelle |
| SW01 – (Hold for 5 s) | Memorise name | Mrs. Anabelle |
| SW02 | End of sequence | Mrs. Anabelle |
| Action A03 | List D selection | |
| SW01 – 1x | Call MENU | MENU |
| SW02 – (Down) | Call 1st sub-menu | NAME |
| SW01 – 1x | Call letter A | A |
| SW01 – 1x | Call letter B | B |
| SW01 – 1x | Call letter C | C |
| SW01 – 1x | Call letter D | D |
| SW01 – 1x 3 sec | Confirm letter D | D selected |
| SW02 – (Down) | Call first name in list D | Mr. Davant |
| SW02 – (Down) | Call next name in list D | Mr. Dubois |
| SW02 – (Down) | Call next name in list D etc. | Mr. Dupont |
| SW03 – (Up) | Call previous name in list D | Mr. Dubois |
| SW01 – (Hold for 5 s) | Memorise name | Mr. Dubois |
| SW02 | End of sequence | Mr. Dubois |
| Action B01 | | |
| SW01 – 1x | Call MENU | MENU |
| SW02 – (Down) 2x | Call second sub-menu | EDIT MENU |
| SW03 + (Up) | Return to previous MENU | MENU |
| Action B02 | Select EDIT MENU | |
| SW01 – 1x | Call MENU | MENU |
| SW02 – (Down) 2x | Call second sub-menu | EDIT MENU |
| SW01 + 1x (Hold for 5 s) | Confirm EDIT MENU | EDIT |
| SW02 – (Down) 1x | Letter A | A |
| SW02 – (Down) 1x | Letter B | B |
| SW02 – (Down) 1x | Letter C | C |
| SW03 + (Up) | Return to letter B | B |
| SW01 + 1x (Hold for 3 s) | Confirm letter B | B_ |
| SW02 – (Down) 1x | Letter A | BA |
| SW02 – (Down) 1x | Letter B | BB |
| SW02 – (Down) 1x | Letter C | BC |
| SW02 – (Down) 1x | Letter D | BD |
| SW01 + 1x (Hold for 3 s) | Confirm letter D etc. | BD_ |
| SW01 + 1x (Hold for 5) | Confirm memorisation of name | BD AVA |

In addition, switches Sw01 and Sw02 can be used to in menu set-up as shown in Table 2 below.

TABLE 2

| Action | Function | Display |
|---|---|---|
| Action | Communication menu | |
| SW01 – 1x (Hold for 5 s) | Call MENU SETUP | SETUP |
| SW02 – (Down) | Call first sub-menu | COMMUNICATION |
| SW02 – 1x (Hold for 5 s) | Sub-menus in communication mode | IR |
| | | RS485 |
| | | CON6 |
| | | PROG |
| SW01 – 1x (Hold for 5 s) | Confirm communication type | |
| Action | Light menu | |
| SW02 – (Down) | Call second sub-menu | LIGHT |
| SW02 – 1x (Hold for 5 s) | Sub- menus light mode | LED 2 colours |
| | | LED 3 colours |
| | | LED 8 colours |
| | | LED OFF |
| | | LED AUTO |
| | | LED SLAVE |
| | | LED VOTE |
| SW01 – 1x (Hold for 5 s) | Confirmation light type | |
| Action | Menu display | |
| SW02 – (Down) | Call third sub-menu | DISPLAY |
| SW02 – 1x (Hold for 5 s) | Sub-menus display mode | TEST |
| | | V BARS |
| | | H BARS |
| | | K BARS |
| | | DOT |
| | | OFF |
| SW01 – 1x (Hold for 5 s) | Confirmation display type | |
| Action | Menu Address | |
| SW02 – (Down) | Call fourth sub-menu | ADDRESS |
| SW02 – 1x (Hold for 5 s) | Sub-menus address mode | AUTO |
| | | OFF |
| SW01 – 1x (Hold for 5 s) | Selection | MANUAL |
| SW02 – (Down) 1x | | 001 |
| SW02 – (Down) 1x | | 002 |
| | etc. | |
| SW03 – (UP) | | 001 |
| SW01 – 1x (Hold for 5 s) | Confirm address number | 001_ |

Switch Sw04 may be used as a reset switch and is located in a position on the electronic paper display device where it can be accessed. In one embodiment, the switches Sw01, Sw02, Sw03, Sw04 may be located at the top of the electronic paper display device to provide easy access, switches Sw01, Sw02, Sw03 being located centrally for easy access and switch Sw04 being located towards the right-hand edge of the board as shown in FIG. 9.

Four spring-loaded connectors CN1, CN2, CN3, CN4 are provided for connecting the circuit board to the base. These may be so-called "piston-spring loaded connectors" which allow the connection and disconnection of the panel relative to the base without hooking whilst ensuring superb conductivity when the panel is engaged in the base. In one embodiment, the spring-loaded connector (SLC) comprises a straight SLC Model 813-S1-NNN-10-017101 (7.5 mm high) manufactured by Preci-dip in Switzerland.

The connections made between the electronic paper display 100 and the associated display drivers 110 are, typically, by way of flat cables and "zero insertion force" (ZIF) connectors, for example, FH28 Series Flexible Printed Circuit and Flexible Flat Cable ZIF Connectors manufactured by the Hirose Electric Group, are used to provide a "secure actuator lock and retention" to ensure that there is perfect conductivity between the base and the electronic paper display. As described above, the cables may provide any suitable number of contacts according to the number of character blocks and segments in each character block.

In a preferred embodiment, the power supply (in the form of a re-chargeable battery, not shown) is located inside the panel 102. The docking station does not need any power provided to it if the battery is located within the panel. However, the docking station 200 may also comprises a battery or be connected to an external power supply if power additional to the battery on the circuit board is required.

In a preferred embodiment, the LED lights controlled by the control buttons 155 (FIG. 1) described above are inserted in a proximity of the recess 610 of the base 600. The panel 102 is preferably manufactured in Plexiglas such that the light emitted by the LEDs is diffused throughout the panel and the entire panel acquires the colour of the light emitted by the LEDs.

As described above, in a preferred embodiment, the electronic components 20 are provided on the circuit board in the panel and the docking station is used as a simple base for supporting the panel. In another embodiment, the electronic components 20 may be provided in the docking station or divided between the panel and the docking station.

In another embodiment, the docking stations may be equipped with at least one lithium-ion batteries which may provide complete autonomy for a period of up to two weeks without modification of the display or up to one week with change daily of the displayed names. A "test battery" procedure may be utilised to display the battery status and remaining battery capacity directly on the electronic display. Charging time for such batteries is estimated to be two hours to regain full autonomy. The high autonomy of the display is derived, in part, from the technology used, that is, the electronic paper display, the choice of low power electronic circuits, and a processor which may be programmed to place the device into "standby" mode in the absence of dedicated information.

If backlighting is to be implemented in one embodiment of the electronic paper display device, another power supply may be required in addition to the battery provided on the circuit board as more power will be required for the lighting elements used as backlights.

It will readily be appreciated that it may be possible to integrate the circuit board with the electronic paper display so that minimal connections between the two are needed.

Although the present invention has been described with reference to specific embodiments of the electronic paper display device, it will be readily appreciated that other embodiments are also possible.

The invention claimed is:

1. An electronic name plate comprising:
   an electronic paper display configured for displaying at least one character, the electronic paper display including an array of character blocks, each character block being configurable to display a character and comprising a plurality of segments, wherein the plurality of segments comprises at least 26 segments, each segment being configured to be individually switched in accordance with a signal applied thereto, wherein switching of one or more segments defines a character to be displayed,
   a processor connected to the electronic paper display and configured for controlling the characters to be displayed in the array of character blocks by applying signals to one or more segments in a character block to switch the segment based on a character to be displayed,
   at least a receiver connected to the processor and configured for receiving character information and for transmitting the character information to the processor, the processor applying signals to one or more of the plurality of segments in the character blocks to switch one or more of the segments based on the received character information, and
   a power supply connected to at least the processor and configured for providing power to the processor at least when a change in the electronic paper display is required, one or more segments in one or more character blocks being switched to make the change in the electronic paper display.

2. Electronic name plate according to claim 1, wherein the electronic name plate further comprises a driver connected between the electronic paper display and the processor, the driver being configured to provide the signals to each segment in a character block to switch the segment based on received character information.

3. Electronic name plate according to claim 1, wherein the processor further comprises a memory, the memory being configured for storing data to be displayed on the electronic paper display, the data comprising at least character information.

4. Electronic name plate according to claim 1, wherein the receiver is configured to receive and transmit character information using at least one of: radio, sonic, ultrasonic, and optical frequencies.

5. Electronic name plate according to claim 4, wherein the receiver is configured to receive and transmit character information using infrared frequencies.

6. Electronic name plate according to claim 1, further comprising an array of lights which can be controlled by at least one button connected to the processor.

7. Electronic name plate according to claim 6, wherein the array of lights comprises a plurality of light-emitting diodes.

8. Electronic name plate according to claim 6, wherein the array of lights comprises at least one backlight.

9. Electronic name plate according to claim 1, further comprising a panel in which the electronic paper display is mounted.

10. Electronic name plate according to claim 9, wherein at least one of: the processor, the receiver, the power supply, the driver and the memory is located on a circuit board mounted in the panel.

11. Electronic name plate according to claim 1, wherein the electronic name plate further comprises at least a docking station configured to support the electronic paper display.

12. Electronic name plate according to claim 1, wherein the plurality of segments comprises between 26 and 40 segments.

13. Electronic paper display according to claim 1, wherein the signals applied to one or more of the segments in the character blocks comprises a square wave.

14. Electronic paper display according to claim 1, further comprising a finite state machine configured for controlling the segments in each character block.

15. Electronic paper display according to claim 14, wherein the finite state machine is configured to have four states for performing updates for each segment of each character block.

16. Electronic paper display according to claim 1, wherein each segment is configured to hold state until the processor applies a signal to change the state thereof.

17. Electronic paper display according to claim 1, wherein the processor is configured to apply a signal to change globally the state of all segments in the array of character blocks.

18. An audio visual system comprising:
   a plurality of electronic name plates, each electronic name plate including:
   an electronic paper display including an array of character blocks, each character block being configurable to display a character and comprising a plurality of segments, wherein the plurality of segments comprises at least 26 segments, each segment being configured to be individually switched in accordance with a signal applied thereto, wherein switching of one or more segments defines a character to be displayed,
   a processor connected to the electronic paper display and configured for controlling the characters to be displayed in the array of character blocks by applying signals to one or more segments in a character block to switch the segment based on a character to be displayed,
   at least a receiver connected to the processor and configured for receiving character information and for transmitting the character information to the processor, the processor applying signals to one or more of the plurality of segments in the character blocks to switch one or more of the segments based on the received character information, and a power supply connected to at least the processor and configured for providing power to the processor at least when a change in the electronic paper display is required, one or more segments in one or more character blocks being switched to make the change in the electronic paper display;

a transmitter for transmitting data to at least one receiver, the data comprising the information to be displayed on each electronic name plate, and a controller for controlling the transmitter and each individual electronic name plate.

* * * * *